United States Patent [19]

Engelhardt et al.

[11] Patent Number: 4,512,645

[45] Date of Patent: Apr. 23, 1985

[54] FILM PROCESSOR TANK WITH TANK DIVIDER

[75] Inventors: Billy M. Engelhardt, Lakeworth, Tex.; Dwane L. Moore, Wichita, Kans.

[73] Assignee: Jamieson Film Company, Dallas, Tex.

[21] Appl. No.: 592,467

[22] Filed: Mar. 22, 1984

[51] Int. Cl.³ .................................................. G03B 3/02

[52] U.S. Cl. .................................... 354/324; 354/338; 134/122 P

[58] Field of Search ............... 354/316, 320, 321, 322, 354/328, 338, 339; 134/64 P, 122 P

[56] References Cited

U.S. PATENT DOCUMENTS

| | | | |
|---|---|---|---|
| 2,914,999 | 12/1959 | Jamieson | 134/122 P |
| 3,043,206 | 7/1962 | Fulton | 134/64 P |
| 3,593,642 | 7/1971 | Becheiraz | 134/122 P |
| 3,595,159 | 7/1971 | Bull | 134/122 P |
| 3,831,612 | 8/1974 | Limoges | 354/328 |

FOREIGN PATENT DOCUMENTS

| | | | |
|---|---|---|---|
| 1140299 | 7/1957 | France | 354/339 |

*Primary Examiner*—A. A. Mathews

*Attorney, Agent, or Firm*—Edwin H. Crabtree

[57] ABSTRACT

An improved film processor tank for processing photographic film and paper. The tank characterized by having an integrally formed round bottom with a contoured tank divider for improved film transporting, chemistry circulation in the tank and air drying of the film and paper.

3 Claims, 6 Drawing Figures

FILM PROCESSOR TANK WITH TANK DIVIDER

BACKGROUND OF THE INVENTION

The subject invention relates to a film processor tank and more particularly but not by way of limitation to a high speed deep tank film transport processor for transporting film and paper therein.

Heretofore, there have been various types of deep tank film transport systems such as described in U.S. Pat. No. 2,914,999 and assigned to the assignee of record of the subject invention. Also, there are various types of roller transport systems which are used for receipt in film processing tanks. None of the above mentioned film processors provide the unique features of the subject improved film processor tank with divider as disclosed herein.

SUMMARY OF THE INVENTION

The improved film processor tank with divider provides a means for improved transporting of film and paper to be developed through a film processor unit.

The tank provides a round bottom tank housing which enables the use of a threading tape for guiding a film leader through the bottom of the processor tanks.

The divider has a concave shape with apertures along the opposite sides for improved agitation of chemicals against the film along with improved air drying of the film and paper after it has been exposed and developed by the film processor chemicals.

The concave shaped divider is adapted for being adjusted along the length of the tank housing for regulating the time the film is exposed in a particular tank.

Also the divider, by design, reduces the amount of contact the sides of the tank make with the sides of the film and paper being developed thereby reducing the chance of scratching or marring the film and its emulsion.

The tank divider further includes spring spacers attached to the ends of the divider for preventing a bottom idle roller from engaging the bottom of the tank and controlling the height of the idle roller above the bottom of the round bottom tank housing.

The improved processor tank for receiving film paper and the like includes a tank housing integrally formed and having a round bottom with an overflow port in the side thereof. A hollow tank divider is disposed along the length of the tank housing and is slidably received therein through the use of spring spacers mounted on the ends of the divider. The divider includes an idle roller mounted on the bottom of the divider. The divider includes an inlet port in the top thereof for receiving a fluid and apertures along the length thereof for discharging the fluid into the tank housing and adjacent the film as the film is transported thereby.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
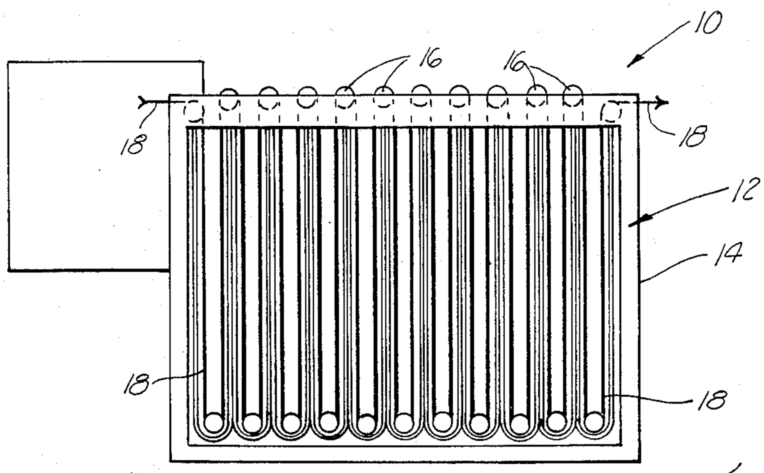
FIG. 1 illustrates a film processing unit using a plurality of the subject improved film processor tanks.

In FIG. 1 a film processor unit is shown and designated by general reference numeral 10. The unit 10 is made up of a plurality of improved film processor tanks 12 received in a film processor housing 14 having a plurality of drive rollers 16 disposed above and between each of the tanks 12. In this view a roll of film indicated by arrow 18 is transported through the tanks 12.

Figure 2:
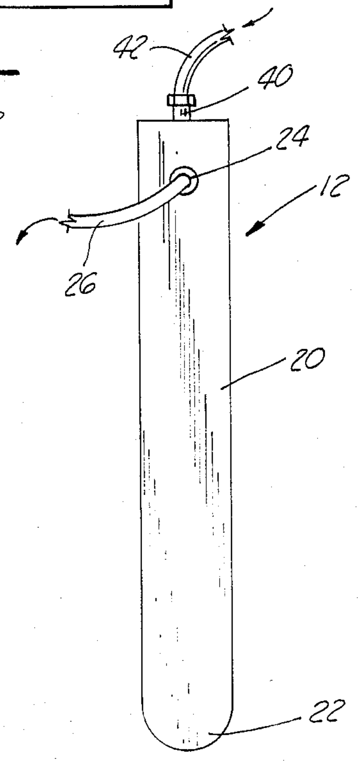
FIG. 2 illustrates a side view of the film processor tank.

In FIG. 2, one of the individual improved film processor tanks 12 is shown having an integrally formed housing 20 with a round bottom 22 used for ease in threading film or paper to be processed therethrough. The housing 20 further includes an overflow port 24 connected to a line 26 for use in receiving film processing chemicals when they are discharged from the tank housing 20.

Figure 3:
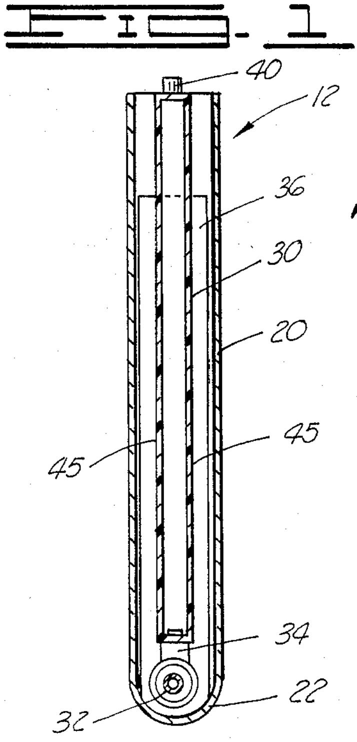
FIG. 3 illustrates a side sectional view of the tank.

FIG. 3 illustrates a side sectional view of the tank 12 with a hollow tank divider 30 slidably received therein. The divider 30 includes an idle roller 32 which is concave in shape and mounted on a bottom 31 of the divider 30 by a pair of roller brackets 34 which are snapped into the bottom 31 of the divider 30.

Figure 6:
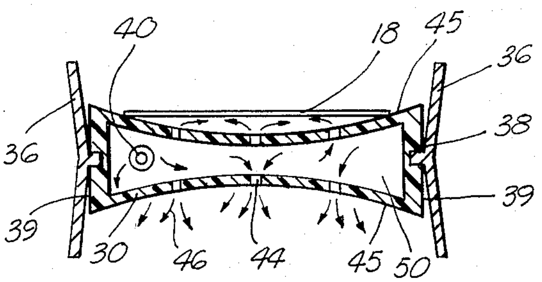
FIG. 6 illustrates a bottom sectional view of the hollow tank divider.

The divider 30 further includes a pair of elongated spring spacers 36 which are slidably received in grooves 38 shown in FIG. 6 along ends 39 of the divider 30. The spacers 36 are used for centering the divider 30 inside the tank housing 20 and positioning the idle roller 32 above the round bottom 22 of the tank housing 20.

Figure 4:
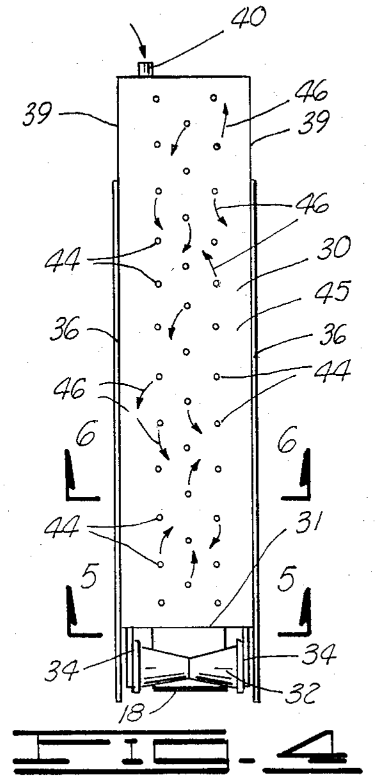
FIG. 4 illustrates a front view of the hollow tank divider.

The hollow tank divider 30 further includes an inlet port 40 in the top thereof for receiving chemicals or air from a dryer blower through a line 42 shown in FIG. 2. The chemicals or dryer air are received into the divider 30 and discharged out a plurality of apertures 44 disposed in a spaced relationship to each other and along the length of sides 45 of the divider 30 as shown in FIG. 4. The discharge of the fluid is indicated by arrows 46.

By discharging the fluid such as film processing chemicals or dryer air and as shown improved impringement is provided as the film 18 is transported down the sides 45 of the divider 30 thereby improving development time, improved film processing and better circulation of the chemicals and the dryer air.

Figure 5:
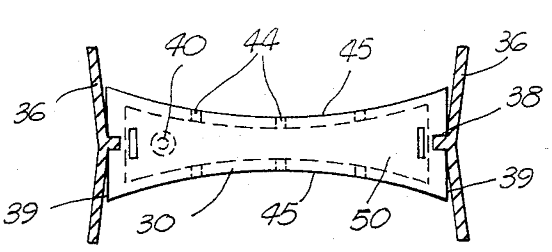
FIG. 5 illustrates a bottom view of the tank divider with idle roller removed.

In FIG. 5 a bottom view of the tank divider 30 is shown with the bottom idle roller 32 removed. In this view, a hollow cavity 50 inside the divider 30 is seen. Also, the inlet port 40 is shown in dotted lines.

In FIG. 6 a cross section of the hollow tank divider 30 can be seen with a portion of the film 18 shown disposed against the side 45 of the divider 30. In FIGS. 5 and 6 it can be seen the opposite sides 45 of the divider 30 are concave in shape and only the edges of the film 18 contact the sides 45 as the film 19 is transported thereby. The concave sides 45 reduce the chances of damaging the emulsion on the film 18 as the film is processed.

The improved film processor tank 12 as described above greatly improves deep tank film processing with improved film transporting, better circulation of chemicals and dryer air and overall improved quality of developed film and paper.

Changes may be made in the construction and arrangement of the parts or elements of the embodiments as described herein without departing from the spirit or scope of the invention defined in the following claims.

What is claimed is:

1. An improved film processor tank for receiving film, paper and the like therein, the tank mounted in a film processor unit for receiving a fluid such as film processing chemicals or dryer air, the tank comprising:

a tank housing integrally formed and having a round bottom and an overflow port in the side thereof; and a hollow tank divider disposed along the length of the tank and slidably received therein, the divider having a concave idle roller mounted on the bottom thereof, the divider having an inlet port in the top thereof for receiving the fluid and apertures along the length thereof for discharging the fluid into the tank housing adjacent the film as it is transported thereby, the opposite sides of the divider concave in shape for limiting the contact of the film against the sides of the divider as the film is transported thereby.

2. The tank as described in claim 1 wherein the opposite ends of the tank divider include elongated spring spacers slidably mounted therein for centering the divider as it is received inside the tank housing.

3. An improved film processor tank for receiving film, paper and the like therein, the tank mounted in a film processor unit for receiving a fluid such as film processing chemicals or dryer air, the tank comprising:

a tank housing integrally formed and having a round bottom;

a hollow tank divider disposed along the length of the tank, the divider having an idle roller mounted on the bottom thereof, the divider having an inlet port in the top thereof for receiving the fluid and apertures along the length of the divider for discharging the fluid into the tank housing and adjacent the film as it is transported thereby; and elongated spring spacers attached to the opposite ends of the tank divider, the spacers disposed along the length of the divider for centering the divider in the tank.

* * * * *